US009526115B1

(12) United States Patent
Zakaria et al.

(10) Patent No.: US 9,526,115 B1
(45) Date of Patent: *Dec. 20, 2016

(54) MULTIPLE PROTOCOL SUPPORT IN DISTRIBUTED DEVICE SYSTEMS

(71) Applicant: Amazon Technologies, Inc., Seattle, WA (US)

(72) Inventors: Omar FawazHashim Zakaria, San Jose, CA (US); Menashe Haskin, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/256,850

(22) Filed: Apr. 18, 2014

(51) Int. Cl.
| H04L 12/28 | (2006.01) |
| H04W 74/04 | (2009.01) |
| G10L 21/06 | (2013.01) |
| H04W 4/00 | (2009.01) |

(52) U.S. Cl.
CPC .............. *H04W 74/04 (2013.01); G10L 21/06 (2013.01); H04W 4/008 (2013.01)

(58) Field of Classification Search
CPC .................................................. H04L 12/282
See application file for complete search history.

(56) References Cited

U.S. PATENT DOCUMENTS

| 7,418,392 B1 | 8/2008 | Mozer et al. |
| 7,720,683 B1 | 5/2010 | Vermeulen et al. |
| 7,774,204 B2 | 8/2010 | Mozer et al. |
| 8,983,383 B1 * | 3/2015 | Haskin .......................... 455/41.2 |
| 2005/0048914 A1 * | 3/2005 | Sartori ................. H04B 7/2606 455/11.1 |
| 2005/0075128 A1 * | 4/2005 | Diedrich et al. ............ 455/552.1 |
| 2008/0154398 A1 * | 6/2008 | Moorer et al. ................... 700/90 |
| 2008/0260169 A1 * | 10/2008 | Reuss ....................... H04R 1/10 381/58 |

(Continued)

FOREIGN PATENT DOCUMENTS

WO  WO2011088053 A2  7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

*Primary Examiner* — David Bilodeau
(74) *Attorney, Agent, or Firm* — Lee & Hayes, PLLC (57) ABSTRACT

A base device may work in conjunction one or more peripheral devices to capture audio from different locations within a room. The peripheral devices may include a companion device and an accessory device, either or both of which may be present in a given situation or deployment. The base device is configured to communicate with the companion device using a first wireless communications protocol and with the accessory device using a second wireless communications protocol. When both of the companion and accessory devices are present, however, the companion and accessory devices communicate with each other using the second wireless communications protocol and the companion device relays communications between the base device and the accessory device. This avoids the need for the base device to use the second wireless communications protocol and reduces contention for shared resources by the base device.

20 Claims, 5 Drawing Sheets

(56) References Cited

U.S. PATENT DOCUMENTS

| | | | |
|---|---|---|---|
| 2011/0313849 A1* | 12/2011 | Brueck et al. | 705/14.45 |
| 2012/0016678 A1* | 1/2012 | Gruber et al. | 704/275 |
| 2012/0223885 A1 | 9/2012 | Perez | |
| 2013/0183944 A1* | 7/2013 | Mozer et al. | 455/414.1 |
| 2013/0226578 A1* | 8/2013 | Bolton et al. | 704/235 |
| 2013/0301429 A1* | 11/2013 | Peters | H04L 45/70 370/252 |
| 2013/0337762 A1* | 12/2013 | Buch et al. | 455/404.1 |
| 2014/0136195 A1* | 5/2014 | Abdossalami et al. | 704/235 |
| 2014/0156281 A1* | 6/2014 | Boyd et al. | 704/275 |

\* cited by examiner

MULTIPLE PROTOCOL SUPPORT IN DISTRIBUTED DEVICE SYSTEMS

BACKGROUND

As the processing power available to devices and associated support services continues to increase, it has become practical to interact with users through speech. For example, a device may generate speech or render other audio content for a user, and the user may provide commands and other input to the device by speaking.

Certain types of speech-enabled devices may utilize or work in conjunction with remote microphones that are placed about a room. Communications with the remote microphones may use different types of communication protocols.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

A distributed voice controlled system may be used to interact with a user through speech, including user speech and system-generated speech. In certain embodiments, the distributed voice controlled system may have a base device and one or more peripheral devices that are positioned at different locations within a room. The peripheral devices may use different communication protocols or technologies to communicate with the base device.

The base device may have a microphone for capturing input audio and a loudspeaker for generating output audio. The input audio may include user speech and other environmental audio. The output audio may include system-generated speech, music, spoken word, or other types of audio.

The peripheral devices may have or comprise microphones that supplement the microphone of the base device by capturing user speech and other audio from different locations within the room. The peripheral devices may in some cases provide better representations of user speech because the signals generated by the microphones of the peripheral devices are less dominated by output from the loudspeaker of the base device.

In certain embodiments, the base device may have a Wi-Fi® interface and a Bluetooth® interface. The base device may be configured to communicate with an Internet-based service using the Wi-Fi interface. In addition, the base device may be configured to receive audio from different types of microphone peripherals using one or both of the Wi-Fi and Bluetooth interfaces. For example, one type of microphone peripheral may comprise a Bluetooth microphone that provides audio through the Bluetooth interface of the base device. Another type of microphone peripheral may comprise an audio device that communicates with the base device and provides audio using Wi-Fi.

In a described implementation, a base device may be used with either one or both of a Bluetooth peripheral and a Wi-Fi peripheral. When the Wi-Fi peripheral is present, the base device communicates with the Wi-Fi peripheral using the Wi-Fi interface of the base device. When the Bluetooth peripheral is present but the Wi-Fi peripheral is not present, the base device communicates directly with the Bluetooth peripheral using the Bluetooth interface of the base device. When both the Bluetooth peripheral and the Wi-Fi peripheral are present, however, the Wi-Fi peripheral receives audio from the Bluetooth peripheral and relays audio from the Bluetooth peripheral to the base device using Wi-Fi. This reduces potential resource contention between the Wi-Fi and Bluetooth interfaces of the base device.

Figure 1:
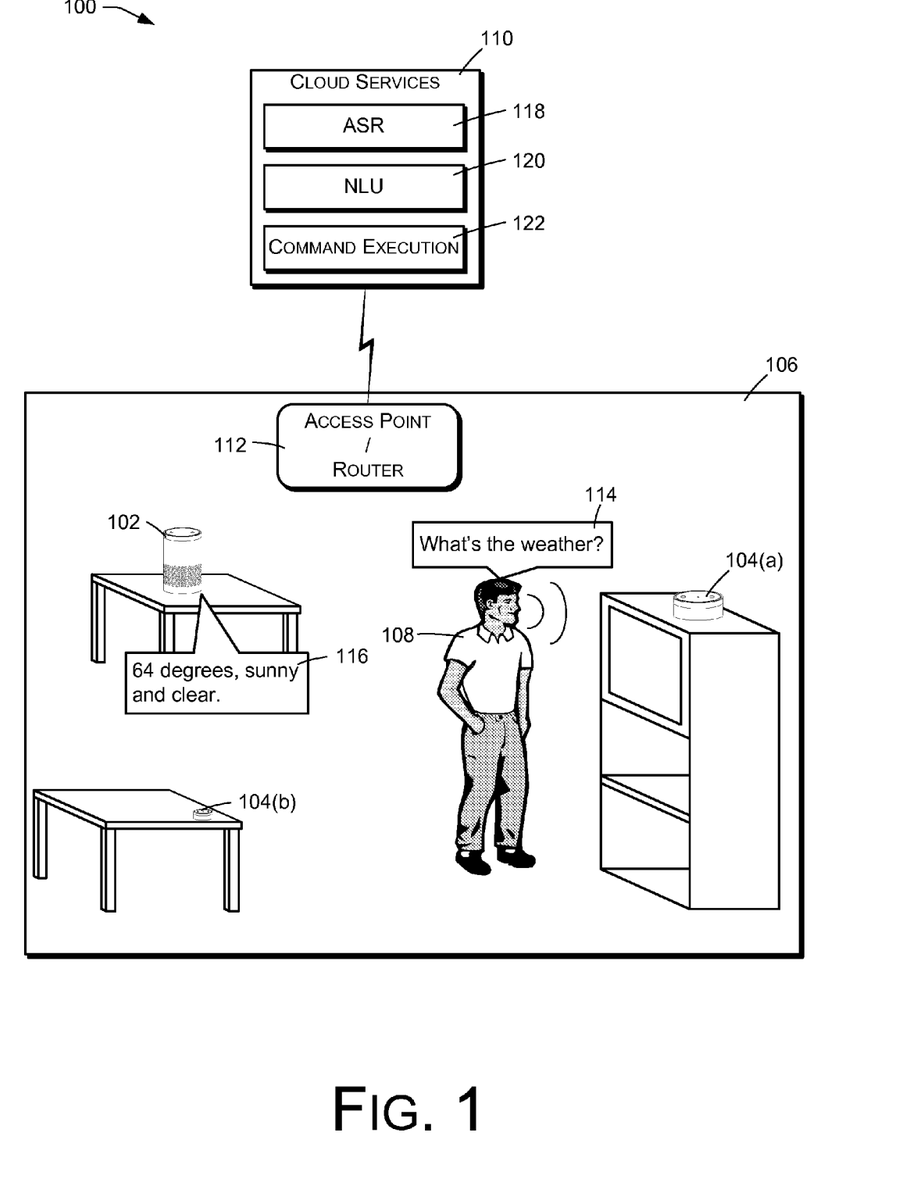
FIG. 1 shows an illustrative voice interactive computing architecture that interacts by voice with a user in conjunction with cloud services.

FIG. 1 shows an example of a distributed voice controlled system 100 having a base device 102 and one or more peripheral devices 104. The illustrated example shows two peripheral devices 104(a) and 104(b), each of which may be configured to operate as a supplemental audio signal source. Specifically, each of the peripheral devices 104 has one or more microphones to generate an audio signal that is provided to the base device 102.

The system 100 may be implemented at least partially within an environment 106 such as a room or an office. A user 108 is present to interact with the voice controlled system 100. Although only one user 108 is illustrated in FIG. 1, multiple users may use the voice controlled system 100.

In this illustration, the base device 102 is physically positioned on a table within the environment 106. The first peripheral device 104(a) is placed on a cabinet or other furniture and physically spaced at a distance from the base device 102. The second peripheral device 104(b) is placed on a table at a distance from the base device 102 and the first peripheral device 104(a). Generally, the base device 102 and any number of peripheral devices 104 may be placed in different position within the room.

Each of the peripheral devices 104 is configured to communicate with the base device 102 via one or more wireless networks or other communications media, such as Bluetooth®, Ethernet, Wi-Fi®, Wi-Fi Direct®, or the like. The base device 102 is also communicatively coupled to cloud services 110 through a public wide-area network such as the Internet. In some embodiments, the base device 102 may communicate wirelessly through a wireless access point and router 112, which may in turn provide communications over the Internet with the cloud services 110.

The cloud services 110 may host any number of voice-enabled applications that can process user input received from the voice controlled system 100 and produce suitable responses. Example applications may include or relate to web browsing, online shopping, banking, bill payment, email, work tools, productivity, entertainment, education, and so forth.

In FIG. 1, the user 108 is shown communicating with the cloud services 110 by speaking in the direction toward the first peripheral device 104(a) and asking an audible question, "What's the weather?", as represented by the dialog bubble 114. The peripheral device 104(a) is equipped with one or more microphones to receive the voice input from the user 108 as well as any other audio sounds in the environment 106.

The user 108 may also speak in the direction toward the base device 102 or the second peripheral device 104(b), each of which may also have one or more microphones to capture user speech and other audio. The cloud services 110 may respond to input from the base device 102 and/or either of the peripheral devices 104.

In response to the spoken query, the system 100 may respond with generated speech as indicated by the dialog bubble 116. The system response may be rendered by the base device 102, which may have one or more loudspeakers to generate audio. In this example, the response indicates, in response to the user's query, that the weather is "64 degrees, sunny and clear."

Functionally, one or more audio streams may be provided from the base device 102, the first peripheral device 104(a), or the second peripheral device 104(b) to the cloud services 110. The audio provided by the microphones of the devices may be processed by the cloud services 110 in various ways to determine the meaning of the spoken query and/or the intent expressed by the query. For example, the cloud services may implement automated speech recognition (ASR) 118 to obtain a textual representation of user speech that occurs within the audio. The ASR 118 may be followed by natural language understanding (NLU) 120 to determine the intent of the user 108. The cloud services 110 may also have command execution functionality 122 to compose and/or implement commands in fulfillment of determined user intent. Such commands may be performed by the cloud services 110 either independently or in conjunction with the base device 102, such as by generating audio that is subsequently rendered by the base device 102. In some cases, the cloud services may generate a speech response, such as the response indicated by the dialog bubble 116, which may be sent to and rendered by the base device 102.

The distributed voice controlled system 100 allows the user 108 to interact with local and remote computing resources predominantly through speech. By placing the base device 102 and one or more peripheral devices 104 throughout the environment 106, the distributed voice controlled system 100 enables the user 108 to move about his or her home and interact with the system 100. With multiple points from which to receive speech input, the audio speech signals can be detected and received more efficiently and with higher quality, minimizing the problems associated with location and orientation of the loudspeaker relative to the audio input devices.

Figure 2:
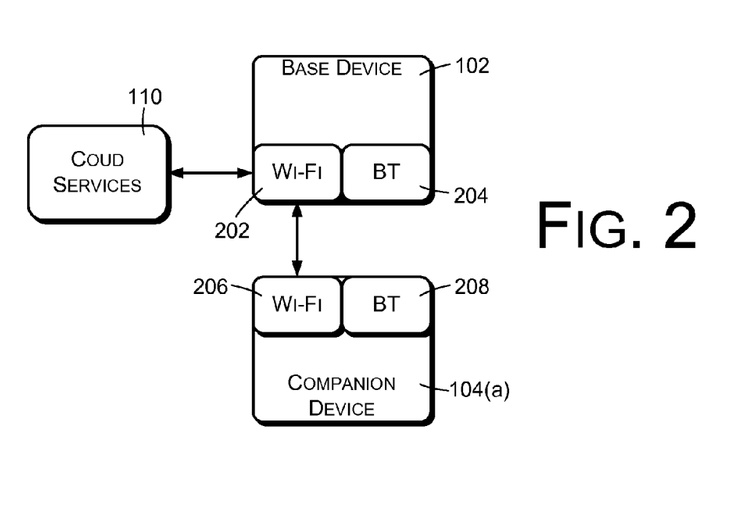
FIGS. 2-4 are block diagrams illustrating techniques for communicating between elements of the interactive computing architecture of FIG. 1.
Figure 3:
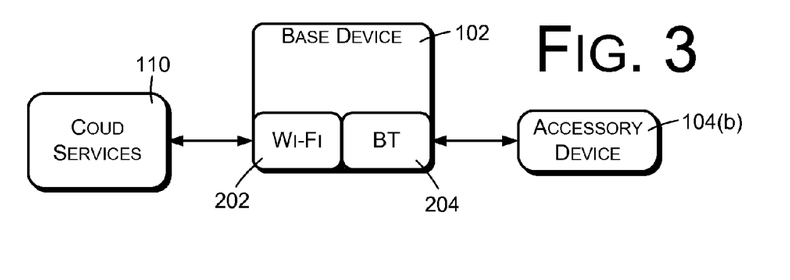
Figure 4:
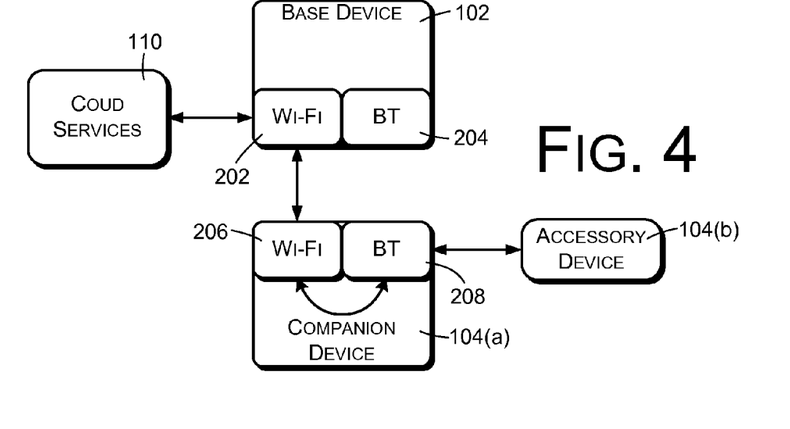

FIGS. 2-4 illustrate examples of how the base device 102 may be configured to communicate with combinations of peripheral devices such as the two peripheral devices 104(a) and 104(b) shown in FIG. 1. For purposes of discussion, the peripheral device 104(a) will be referred to as a companion device 104(a) and the second peripheral device 104(b) will be described as an accessory device 104(b).

Although the base device 102 is designed and configured to work with both the companion device 104(a) and the accessory device 104(b), the actual presence and use of either device is optional in any given installation. FIG. 2 illustrates a situation in which the only the companion device 104(a) is present. FIG. 3 illustrates a situation in which only the accessory device 104(b) is present. FIG. 4 illustrations a situation in which both the companion device 104(a) and the accessory device 104(b) are present.

In certain embodiments, the companion device 104(a) may be similar to the base device 102. For example, the base device 102 and the companion device 104(a) may have similar form factors and may be implemented using similar components and software. Both the base device 102 and the companion device 104(a) may be capable of relatively complex communications and audio processing such as noise reduction and acoustic echo cancellation. The base device 102 and the companion device 104(b) may differ in that the base device 102 may have both a microphone and a loudspeaker while the companion device may have a microphone but may lack a loudspeaker.

Both the base device 102 and the companion device 104(a) may also have similar data communications capabilities. For example, each device may implement first and second wireless communication protocols having corresponding hardware and software protocol stacks. In the described embodiment, the first wireless communication protocol may comprise Bluetooth® or another other wireless, local-area networking protocol used for short-range or device-to-device communications with local peripherals or accessories. The second wireless communication protocol may comprise Wi-Fi® or another other wireless local-area networking (WLAN) communication protocol. In some cases, the first wireless communications protocol may comprise a narrow-band protocol having a relatively low data bandwidth, while the second wireless communications protocol may comprise a wide-band protocol having a relatively high data bandwidth.

The accessory device 104(b) may in some embodiments comprise a Bluetooth microphone that can be paired with either the base device 102 or the companion device 104(a) to provide an audio signal to the base device 102 or the companion device 104(a). In some embodiments, the accessory device 104(b) may be capable of relatively less complex functionality as compared to the companion device 104(a).

Although Wi-Fi and Bluetooth are described as specific examples of the first and second wireless protocols, different embodiments may use different communication technologies and protocols. Furthermore, although certain embodiments are described in the context of audio signals provided from peripheral devices to a base device, communications between the peripheral devices and the base devices may be bi-directional and may include types of data other than audio data.

Referring first to FIG. 2, the base device 102 may have a wireless local-area networking (WLAN) interface 202 and a wireless device interface 204. In the described embodiment, the WLAN interface 202 comprises a Wi-Fi® interface and the wireless device interface comprises a Bluetooth® interface, although other interfaces implementing other communication protocols may be used in other embodiments.

The WLAN interface 202 may be configured to provide communications between the base device 102 and the cloud services 110. The WLAN interface 202 may communicate through an access point and/or router 112 as shown in FIG. 1 and may further communicate through various types of networks with the cloud services 110. Such networks may include local-area networks, wide-area networks, private networks, public networks, the Internet, cellular networks, and other types of networks or communication channels.

The WLAN interface 202 of the base device 102 may also be configured to provide local communications by the base device 102 with one or more local peripheral devices such as the companion device 104(a). The companion device 104(a) may have a WLAN interface 206 to facilitate such communications. The companion device 104(a) may also have a Bluetooth (BT) or other wireless device interface 208, the use of which will be described in the following discussion with reference to FIG. 4.

Wi-Fi communications between the base device 102 and the companion device 104(a) may in some embodiments take place through the access point and router 112. Alternatively, the WLAN interface 202 may be configured to establish a peer-to-peer WLAN communication channel with the WLAN interface 206 of the companion device 104(a). Wi-Fi Direct® is an example of a WLAN peer-to-peer communication protocol that may be used for communications between the base device 102 and the companion device 104(a).

Referring now to FIG. 3, the Bluetooth interface 204 of the base device 102 may be configured to provide direct communications between the base device 102 and the accessory device 104(b) in situations in which the accessory device 104(b) is present and the companion device 104(a) is not present.

FIG. 4 shows the situation in which both the companion device 104(a) and the accessory device 104(b) are present. In this situation, the base device 102 is configured to communicate with the cloud services 110 and with the companion device 104(a) through Wi-Fi, using the Wi-Fi interface 202 of the base device 102 and the Wi-Fi interface 206 of the companion device 104(a). The companion device 104(a) is configured to communicate directly with the accessory device 104(b) through the Bluetooth interface 208 of the companion device 104(a). The companion device 104(a) is configured to receive communications from the accessory device 104(b) and to relay communications between the accessory device 104(b) and the base device 102. The Bluetooth interface 204 of the base device 102 is unused in this situation and may be disabled.

Figure 5:
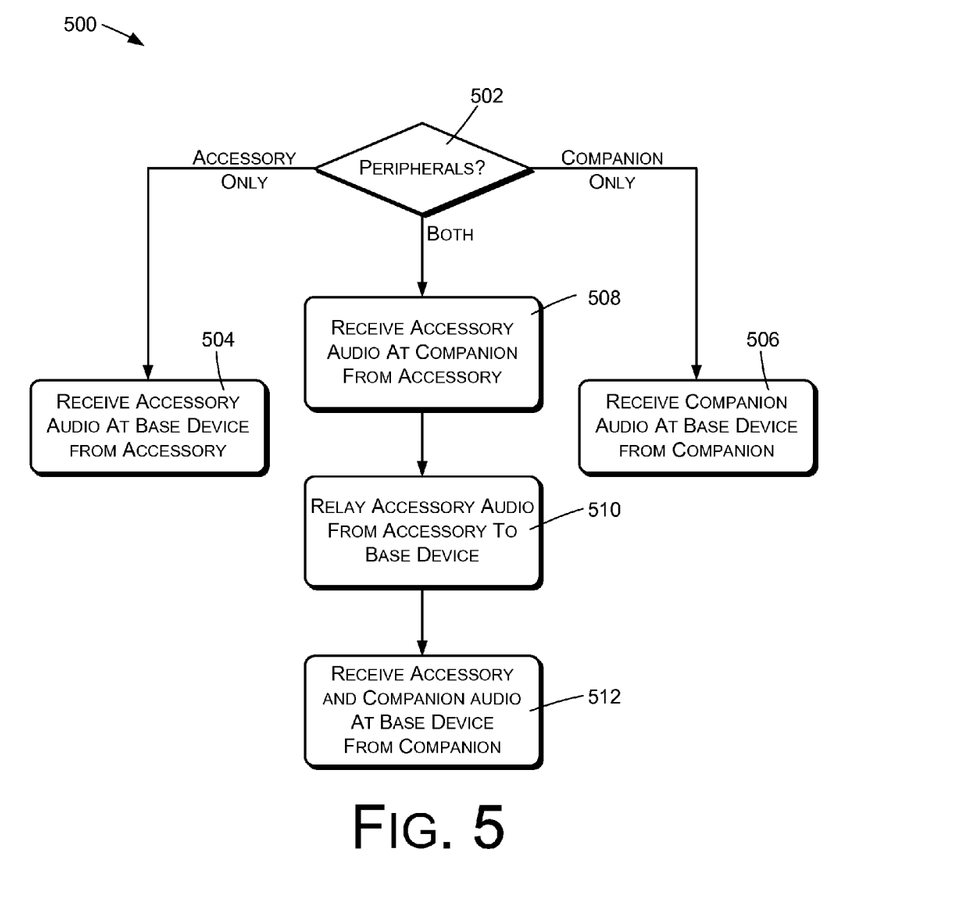
FIGS. 5 and 6 are flow diagrams illustrating methods of communicating between elements of the interactive computing architecture of FIG. 1.

FIG. 5 illustrates a method 500 of communicating with one or more peripheral devices in accordance with the techniques described above. The method 500 is described with reference to a base device, a companion or companion device, and an accessory or accessory device, where the companion and accessory devices produce and provide audio signals that are received by the base device. Although the devices are described as being audio devices that provide and/or receive audio signals, the companion and accessory devices may comprise various types of peripherals, not limited to microphone peripherals or audio peripherals. Furthermore, communications between the base, companion, and accessory devices may involve data other than audio data such as keystrokes, control data, user interface data, display data, and so forth. In addition, data may be exchanged bidirectionally between the various components.

An action 502, which may be performed by the base device, comprises determining which of one or more peripheral devices are present. This may be performed by attempting to contact or communicate with peripherals that are known to be potentially used with the base device, such as the companion device and/or the accessory device. Note that more than one companion device and more than one accessory device may be present in certain situations, and the base device may be configured to communicate with multiple numbers of companion and accessory devices.

If only an accessory device is present, an action 504 is performed of communicating directly with the accessory device to receive audio produced by the accessory device, which is referred to as accessory audio. The accessory audio is received by the base device directly from the accessory device. In certain embodiments, the action 504 may comprise communicating with the accessory device using a wireless device interface and corresponding protocol such as Bluetooth.

If only the companion device is present, an action 506 is performed of communicating directly with the companion device to receive audio produced by the companion device, which is referred to as companion audio. The companion audio is received by the base device directly from the companion device. In certain embodiments, the action 506 may comprise communicating with the companion device using a wireless local-area networking (WLAN) interface and protocol such as Wi-Fi.

If both the accessory device and the companion device are present, actions 508, 510, and 512 are performed. The action 508, performed by the companion device, comprises receiving the accessory audio at the companion device. More specifically, the companion device and the accessory device are configured to communicate with each other so that the accessory device produces and provides the accessory audio to the companion device. The companion device receives the accessory audio directly from the accessory device. In certain embodiment, the action 508 may be performed using a wireless device interface and corresponding wireless device communications protocol such as Bluetooth.

The action 510, also performed by the companion device, comprises relaying data between the accessory device and the base device. In the described embodiment, this may comprise relaying audio received from the accessory device to the base device.

The action 512 comprises receiving both the companion audio and the accessory audio from the companion device. Note that in this situation, where both the accessory device and the companion device are present, the base device does not communicate directly with the accessory device to receive the accessory audio. Rather, the accessory audio is received from the companion device, which has been configured to relay the audio from the accessory device.

The described techniques allow the shifting of certain communication responsibilities from the base device to the companion device. As a result, the base device needs only communicate with a single device, using a single communications protocol, to receive multiple audio streams from multiple devices. This is true even when one of the audio streams is originally produced using a different communications protocol. For example, in the specific embodiment described herein the base device may utilize Wi-Fi to receive communications from the companion device, and the communications may include audio from both the companion device and a Bluetooth accessory device. By configuring the companion device to relay data from the accessory device, the base station may avoid resource contention that might otherwise result from the concurrent use of two different protocols such as Wi-Fi and Bluetooth.

Figure 6:
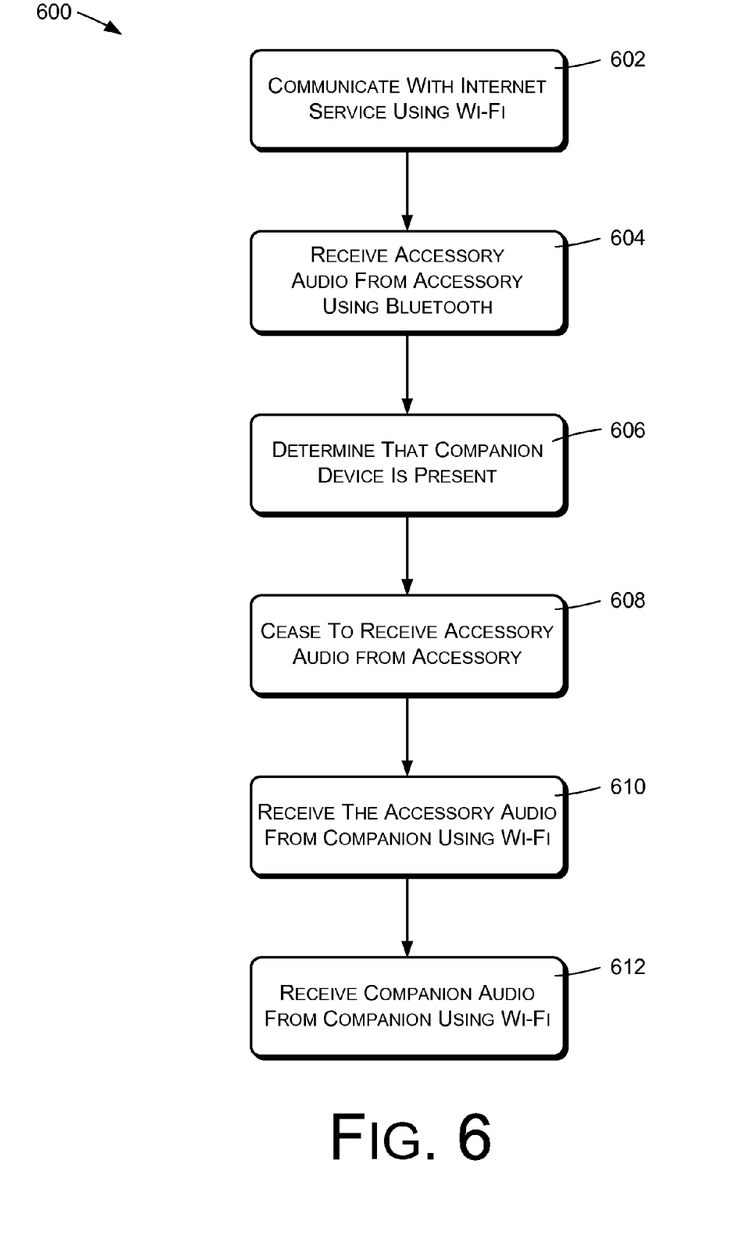

FIG. 6 shows a method 600 that may be implemented by a base device to receive audio and/or to communicate various types of data with one or more peripheral devices. The method 600 is described with reference to a companion device and an accessory device.

Communications between the base device, companion device, and accessory device may utilize first and second communication protocols. For clarity in the following discussion, the first and second communication protocols are assumed to be Wi-Fi and Bluetooth, respectively, which are implemented by respective Wi-Fi and Bluetooth communication interfaces. In various embodiments, however, one or both of the first and second communication protocols may comprise protocols other than Wi-Fi or Bluetooth.

In some embodiments, the first and second communication protocols utilize corresponding first and second frequency bands, respectively. Furthermore, the first and second frequency bands may be shared or may at least partially overlap, as is the case with Wi-Fi and Bluetooth, both of which use the 2.4 GHz frequency band. The techniques described herein may reduce contention within the base device over this shared frequency band and may also reduce contention for other shared resources within the base device.

An action 602 comprises communicating with an Internet service or provider using Wi-Fi. An action 604 comprises communicating with and receiving accessory audio from the accessory device using Bluetooth. The accessory device may in some embodiments comprise a Bluetooth accessory such as a wireless microphone or headset, a user input device, a display device, or other accessory.

An action 606 comprises detecting the presence or availability of the companion device and/or determining that the companion device is present and available. If the companion device is not present or is not available, no further action is taken and the base device continues to communicate with the accessory device using Bluetooth. If the companion device is present and available, however, actions 608, 610, and 612 are performed.

The action 608 comprises ceasing to use the wireless device interface for Bluetooth reception of the accessory audio from the accessory device. More specifically, the action 608 comprises ceasing to communicate directly with the accessory device and ceasing use of the Bluetooth communications interface and protocol. The action 610 comprises instead communicating with the companion device using Wi-Fi to receive the accessory audio from the companion device. In this situation, the companion device is configured to communicate with the accessory device using Bluetooth and to relay audio or other communications between the accessory device and the base device.

The action 612 comprises receiving companion audio, produced by the companion device, in addition to the accessory audio. The companion audio is received from the companion device using Wi-Fi. Accordingly, the base device uses Wi-Fi to receive both the accessory audio and the companion audio.

Figure 7:
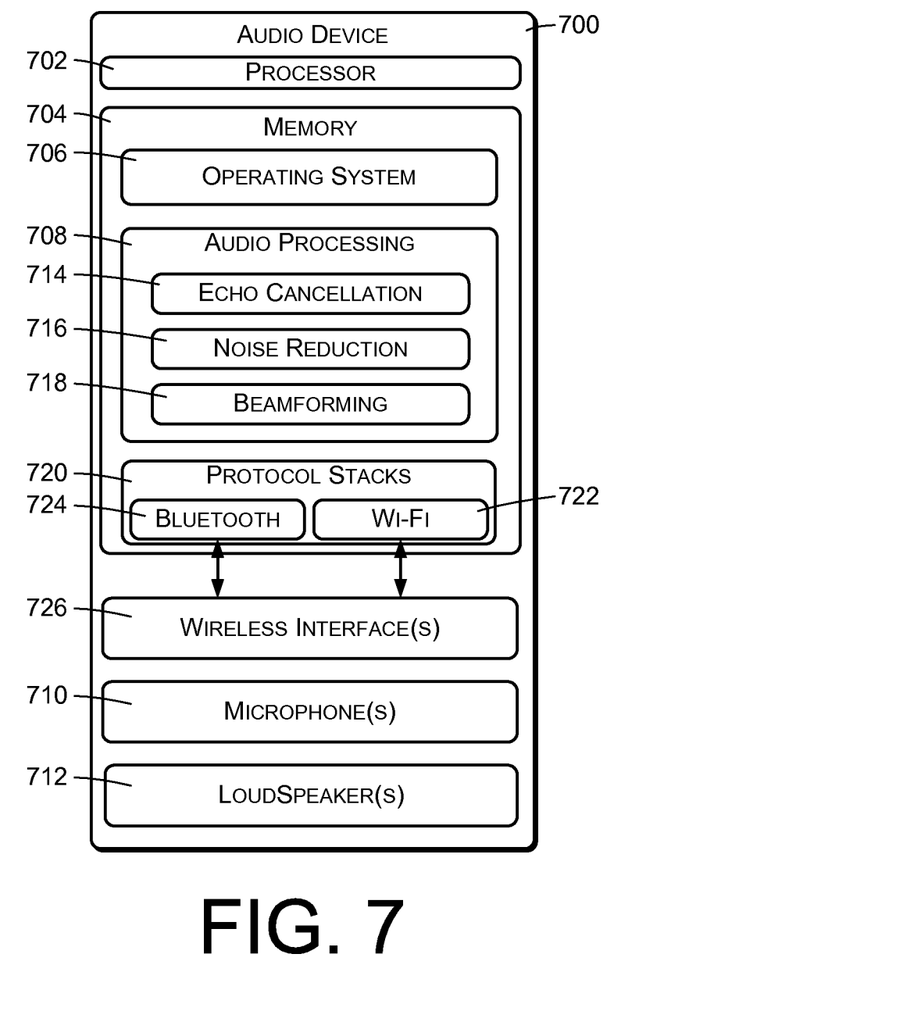
FIG. 7 is a block diagram of an example audio device that may be used to implement techniques described herein.

FIG. 7 shows an example functional configuration of an audio device 700 such as may be used to implement a base device or a companion device. The audio device 700 includes operational logic, which in many cases may comprise a processor 702 and memory 704. The processor 702 may include multiple processors and/or a processor having multiple cores. The memory 704 may contain applications and programs in the form of instructions that are executed by the processor 702 to perform acts or actions that implement desired functionality of the base device 102. The memory 704 may be a type of computer storage media and may include volatile and nonvolatile memory. Thus, the memory 704 may include, but is not limited to, RAM, ROM, EEPROM, flash memory, or other memory technology.

The audio device 700 may have an operating system 706 that is configured to manage hardware and services within and coupled to the audio device 700. In addition, the audio device 700 may include audio processing components 708 for capturing and processing audio including user speech. The operating system 706 and audio processing components 708 may be stored by the memory 704 for execution by the processor 702.

The audio device 700 may have one or more microphones 710 and one or more loudspeakers 712. The one or more microphones 710 may be used to capture audio from the environment of the user, including user speech. The one or more microphones 710 may in some cases comprise a microphone array configured for use in beamforming. The one or more loudspeakers 712 may be used for producing sound within the user environment, which may include generated or synthesized speech. Note that when used as a companion device, the audio device 700 may lack the loudspeaker 712.

The audio processing components 708 may include functionality for processing input audio signals generated by the microphone(s) 710 and/or output audio signals provided to the loudspeaker(s) 712. As an example, the audio processing components 708 may include one or more acoustic echo cancellation or suppression components 714 for reducing acoustic echo in microphone input signals, generated by acoustic coupling between the microphone(s) 710 and the loudspeaker(s) 712. The audio processing components 708 may also include a noise reduction component 716 for reducing noise in received audio signals, such as elements of audio signals other than user speech.

The audio processing components 708 may include one or more audio beamformers or beamforming components 718 that are configured to generate or produce multiple directional audio signals from the input audio signals received from the one or more microphones 710. AEC may be applied by the base device 102 to any or all of such directional audio signals.

The audio device 700 may also implement a one or more protocol stacks 720, corresponding to different communication protocols. For example, the protocol stacks 720 may include a Wi-Fi protocol stack 722 and a Bluetooth communications stack 724. The protocol stacks 720 may utilize wireless interfaces or wireless interface hardware 716 such as amplifiers, antennas, etc.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:

1. A base device comprising:
   a first wireless interface configured to communicate with a companion device according to a first protocol;
   a second wireless interface configured to communicate with an accessory device according to a second protocol, wherein the second protocol is different than the first protocol;
   operating logic configured to perform actions comprising:
      determining that the companion device is present within an environment shared by the base device;
      communicating, based at least in part on determining that the companion device is present, with the companion device using the first wireless interface to receive a companion audio signal produced by the companion device;
      determining that the companion device is not present within the environment and that the accessory device is present within the environment;
      communicating, based at least in part on determining that the companion is not present and the accessory device is present, with the accessory device using the second wireless interface to receive an accessory audio signal produced by the accessory device;
      determining that the companion device and the accessory device are present within the environment; and
      communicating, based at least in part on determining that the companion device and the accessory device are present, with the companion device to receive the accessory audio signal and the companion audio signal using the first wireless interface.

2. The base device of claim 1, the actions further comprising ceasing to use the second wireless interface based at least in part on determining that the companion device is present.

3. The base device of claim 1, the actions further comprising configuring the companion device to:
receive the accessory audio signal from the accessory device; and
relay the accessory audio signal to the base device.

4. The base device of claim 1, wherein the first wireless interface comprises a Wi-Fi interface and the second wireless interface comprises a Bluetooth interface.

5. The base device of claim 1, wherein the first wireless interface and the second wireless interface share a frequency band.

6. The base device of claim 1, further comprising a microphone, the actions further comprising receiving a base device audio signal from the microphone.

7. The base device of claim 1, the actions further comprising causing speech recognition to be performed on at least one of the companion audio signal or the accessory audio signal.

8. A method, comprising:
communicating with a first device using a first wireless communications protocol to receive a first audio signal produced from first audio detected by the first device in a first environment;
detecting a second device that is configured to communicate with the first device using the first wireless communications protocol; and
in response to detecting the second device, (a) communicating with the second device using a second wireless communications protocol to receive a second audio signal produced from second audio detected by the second device from a second, different environment and to receive a third audio signal produced from third audio detected by the first device in the first environment and (b) ceasing the communicating with the first device using the first wireless communications protocol.

9. The method of claim 8, wherein the second device is configured to relay the third audio signal from the first device.

10. The method of claim 8, wherein the first communications protocol comprises a personal-area-networking protocol and the second communications protocol comprises a local-area networking protocol.

11. The method of claim 8, wherein the first communications protocol comprises Bluetooth and the second communications protocol comprises Wi-Fi.

12. The method of claim 8, wherein:
the first wireless communications protocol uses a first frequency band;
the second wireless communications protocol uses a second frequency band; and
the first and second frequency bands at least partially overlap.

13. A method comprising:
determining that a companion device is present within an environment;
communicating with the companion device to receive first audio data produced by the companion device based at least in part on determining that the companion device is present within the environment;
determining that the companion device is not present and an accessory device is present within the environment;
directly communicating with the accessory device to receive second audio data produced by the accessory device based at least in part on determining that the companion device is not present and the accessory device is present within the environment, the second audio data different from the first audio data;
determining that the companion device and the accessory device are present within the environment; and
communicating with the companion device to receive third audio data produced by the accessory device and fourth audio data produced by the companion device based at least in part on determining that the companion device and the accessory device are present, wherein the companion device is configured to relay the third audio data produced by the accessory device.

14. The method of claim 13, ceasing to communicate directly with the accessory device based at least in part on determining the companion device is present within the environment.

15. The method of claim 13, wherein:
communicating with the companion device uses a first wireless communications protocol; and
directly communicating with the accessory device uses a second wireless communications protocol.

16. The method of claim 15, wherein the first and second wireless communications protocols use overlapping frequency bands.

17. The method of claim 13, wherein:
communicating with the companion device uses Wi-Fi; and
directly communicating with the accessory device uses Bluetooth.

18. The method of claim 13, wherein:
communicating with the companion device uses Wi-Fi; and
the companion device is configured to communicate with the accessory device using Bluetooth.

19. The method of claim 13, wherein:
communicating with the companion device comprises receiving first audio generated by the companion device and second audio generated by the accessory device.

20. The base device of claim 1, wherein the accessory audio signal corresponds to first audio detected from the environment by the accessory device and the companion audio signal corresponds to second, different audio detected from the environment by the companion device, wherein the accessory audio is different than the companion audio.

* * * * *